Jan. 19, 1932.                I. MARKS                1,841,748
                    SOUND INDICATOR FOR FILM FOOTAGE
                    Filed Oct. 8, 1931        2 Sheets-Sheet 1

Isidore Marks
INVENTOR:

BY John Buckler
ATTORNEY:

Jan. 19, 1932.   I. MARKS   1,841,748
SOUND INDICATOR FOR FILM FOOTAGE
Filed Oct. 8, 1931   2 Sheets-Sheet 2
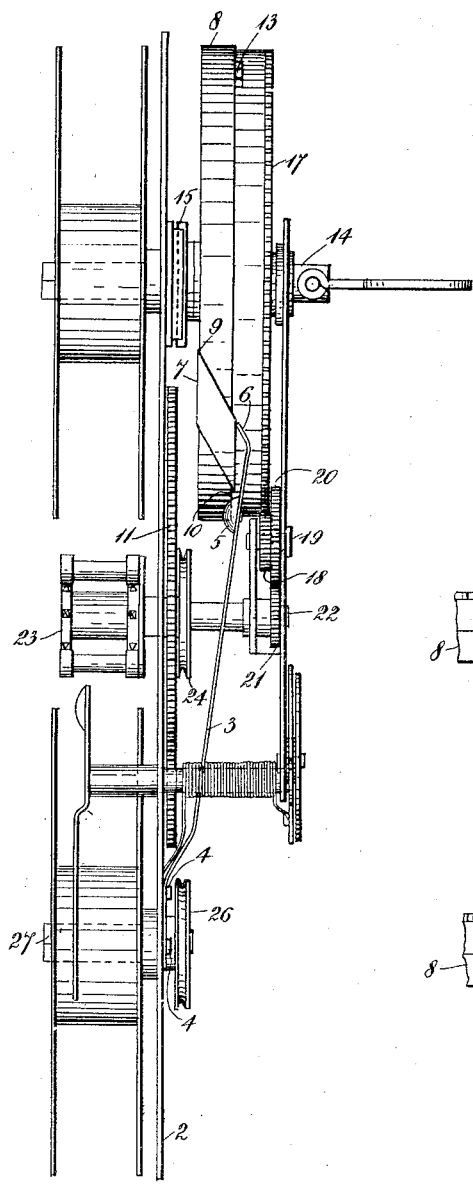
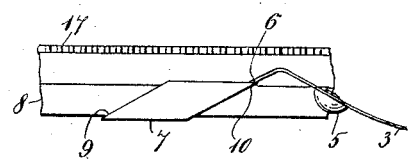
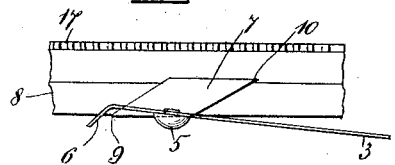
Isidore Marks
INVENTOR
BY John Buckler
ATTORNEY Patented Jan. 19, 1932

1,841,748

UNITED STATES PATENT OFFICE

ISIDORE MARKS, OF BOSTON, MASSACHUSETTS

SOUND INDICATOR FOR FILM FOOTAGE

Application filed October 8, 1931. Serial No. 567,666.

This invention relates to a striking indicator in a motion picture camera, which makes a sound periodically with the film feed, so that the operator, while looking through the view finder, by keeping count of the number of sounds or clicks may know the number of feet of film he has exposed. Each click representing a definite number of feet of film. The invention is intended primarily for the use of the amateur or unskilled person where short scenes and short lengths of film are exposed at a time and where the cost of film is important.

To count seconds during the exposure of an exciting scene usually is inaccurate. This invention comprises a striking mechanism, geared to the film feeding mechanism which in the gearing shown strikes every time 2.1 feet of film have been fed through or exposed in the film gate and makes an audible sound or click which may be counted by the operator. While 2.1 feet is the length of film herein shown, it is obvious that any lengths may be used by the choice of the proper gear ratio.

In the accompanying drawings:

Fig. 2 is an end view of the frame structure removed from the enclosing camera case, showing the spring motor, gearing and striking indicator.

Fig. 3 is a side view of a portion of the motor case, showing the projection which raises the striking arm, the end of which is shown in the raised position, just ready to be released.

Fig. 4 shows Fig. 3, with the end of the striking arm in the released position just ready to be engaged and raised by the projection on the motor case.

Similar reference numerals indicate like parts in the several views.

Figure 1:
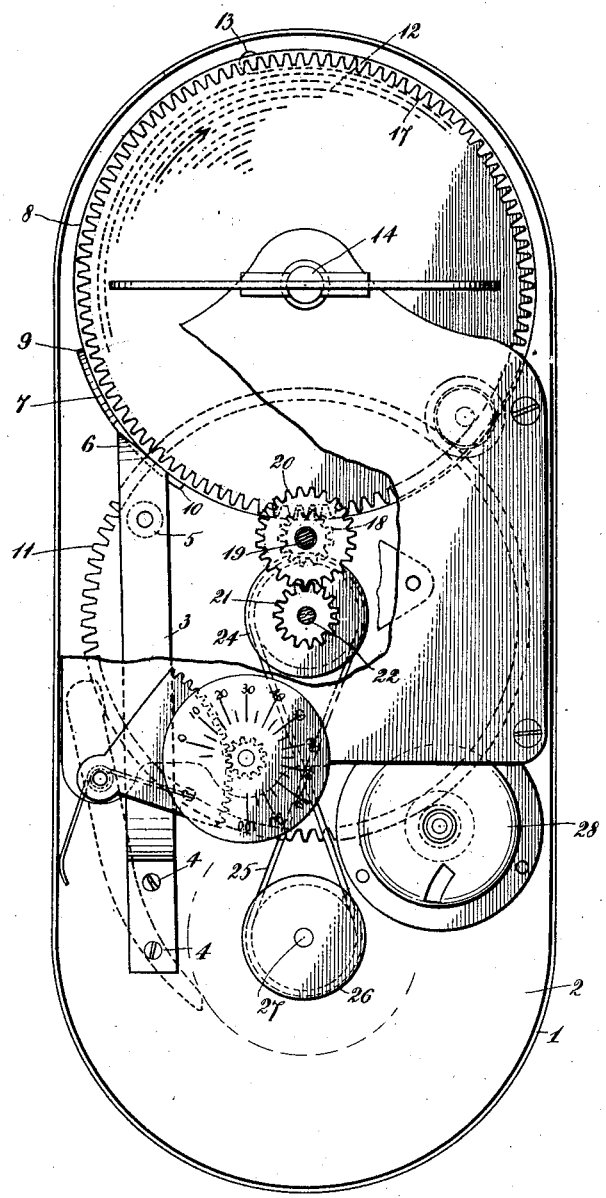
Fig. 1 represents a side elevation of the back of a camera with back cover removed and back plate of the frame structure partly cut away to show the striking indicator as embodied in this invention.

Referring to the drawings, 1 is the enclosing camera case or box, adapted to enclose a multiple plate structure on which is mounted the film feeding, guiding and reeling mechanisms. 2 is the main plate of this structure dividing the camera case or box into the film side and mechanism side. 3 is the striking indicator arm, composed of a flat spring, fastened to plate 2, at 4 and 4 and with striking knob riveted to it at 5. The end 6 of spring arm 3 is slightly bent to increase the throw of knob 5, and is engaged by the diamond shaped projection 7, on the spring motor case 8. At each revolution of said case, which revolves in the direction shown, the lower point 9 of the projection 7, slides under the end 6 of arm 3, raising the end 6 and striking knob 5. As the case 8 continues to revolve, the end 6 of arm 3 slips off of the upper end 10, of the projection 7 releasing the spring arm 3, which, under the action of the spring, snaps back, causing knob 5 to strike the side of the adjacent gear 11. Within the motor case 8 is the motor spring 12, fastened to the case at 13, and with inner end fastened to the wind up shaft 14. Means are provided by a ratchet gear 15, fast to shaft 14, and pawls 16, pivoted on plate 2, to prevent shaft 14 from turning backwards. Fast to the face of the case 8, is the gear 17, meshing with the idler gear 18, fast on shaft 19, which also carries the idler gear 20, which meshes with the pinion 21, fast on shaft 22, which drives the film sprocket 23. Thus the revolutions of the motor case 8 have a constant ratio to the revolutions of the continuous feed sprocket 23, which in the mechanism shown is 1 revolution of case 8=10½ revolutions of sprocket 23. With a sprocket of 8 teeth, one tooth to each picture and 40 pictures per foot of film strip, this ratio equals 1 revolution of case 8 to 2.1 feet of film, fed by the continuous feed sprocket. Thus for each 2.1 feet of film fed through or exposed in the camera, the striking knob 5, is raised and released, striking gear 11 with an audible sound or click.

If the operator predetermines the length of scene or footage of film he wishes to expose, he may count the number of clicks he hears while watching the scene through the view finder.

Gear 11 is fast to the sprocket shaft 22 and take-up pulley 24, which through take-up belt 25 drives the lower take-up pulley 26, fast to take-up reel shaft 27. Gear 11 meshes with and drives a pinion which operates the intermittent film feeding mechanism. Gear 11 also meshes with and drives a pinion which rotates the speed governor mechanism, enclosed in case 28.

Having thus described the invention, what I claim as new and desire to secure by Letters Patent is:

In a motion picture camera, the combination of a supply and take-up reel, a continuous feed sprocket, an intermittent film feeding mechanism, mounted on a multiple plate structure and within said structure, a spring motor in an enclosing case with gears for driving all said mechanism, a film footage striking indicator mechanism, composed of a flexible spring, having a striking knob, and fastened at one end to one plate member and coacting at the other end with a sloping projection on a rotating member, so that periodically the knob is raised and released and strikes an adjacent metal member with an audible sound or click.

ISIDORE MARKS.